(12) United States Patent
Kato

(10) Patent No.: US 7,520,000 B2
(45) Date of Patent: Apr. 14, 2009

(54) INFORMATION REPRODUCING APPARATUS

(75) Inventor: Naoki Kato, Saitama (JP)

(73) Assignee: Sony Corporation, Tokyo (JP)

( * ) Notice: Subject to any disclaimer, the term of this patent is extended or adjusted under 35 U.S.C. 154(b) by 825 days.

(21) Appl. No.: 10/964,496

(22) Filed: Oct. 13, 2004

(65) Prior Publication Data

US 2005/0120241 A1    Jun. 2, 2005

(30) Foreign Application Priority Data

Oct. 15, 2003 (JP) ............................ 2003-354516

(51) Int. Cl.
*G06F 7/04* (2006.01)
(52) U.S. Cl. .......................................... 726/30; 726/33
(58) Field of Classification Search ........................ None
See application file for complete search history.

(56) References Cited

U.S. PATENT DOCUMENTS

| | | | | |
|---|---|---|---|---|
| 4,720,700 A * | 1/1988 | Seibold et al. | ............ | 340/568.1 |
| 5,864,528 A * | 1/1999 | Ikeda et al. | ............... | 369/53.21 |
| 7,065,506 B1 * | 6/2006 | Phillipo et al. | ................ | 705/58 |

FOREIGN PATENT DOCUMENTS

| | | |
|---|---|---|
| JP | 6-334780 | 12/1994 |
| JP | 07-182840 | 7/1995 |
| JP | 07-320387 | 12/1995 |
| JP | 2566117 | 10/1996 |
| JP | 09161348 A * | 6/1997 |
| JP | 2001-117824 | 4/2001 |
| JP | 2001-282477 | 10/2001 |

* cited by examiner

*Primary Examiner*—Emmanuel L Moise
*Assistant Examiner*—David J Pearson
(74) *Attorney, Agent, or Firm*—Finnegan, Henderson, Farabow, Garrett & Dunner, L.L.P.

(57) ABSTRACT

An information reproducing apparatus includes an operation restriction section for stopping a normal reproducing operation by an information reproducing section for any information based on a signal other than another unique signal recorded in a recording medium loaded in a recording medium loading section if a predetermined period of time is elapsed after a judging section judges that the another unique signal read out by a information reproducing section or the another unique reproducing information obtained on the basis of the another unique signal matches with an ID signal or ID information stored in a memory section without further being judged by the judging section whether or not a newly read out unique signal or newly obtained unique reproducing information based thereon matches with the ID signal or the ID reproducing information stored in the memory section.

10 Claims, 4 Drawing Sheets

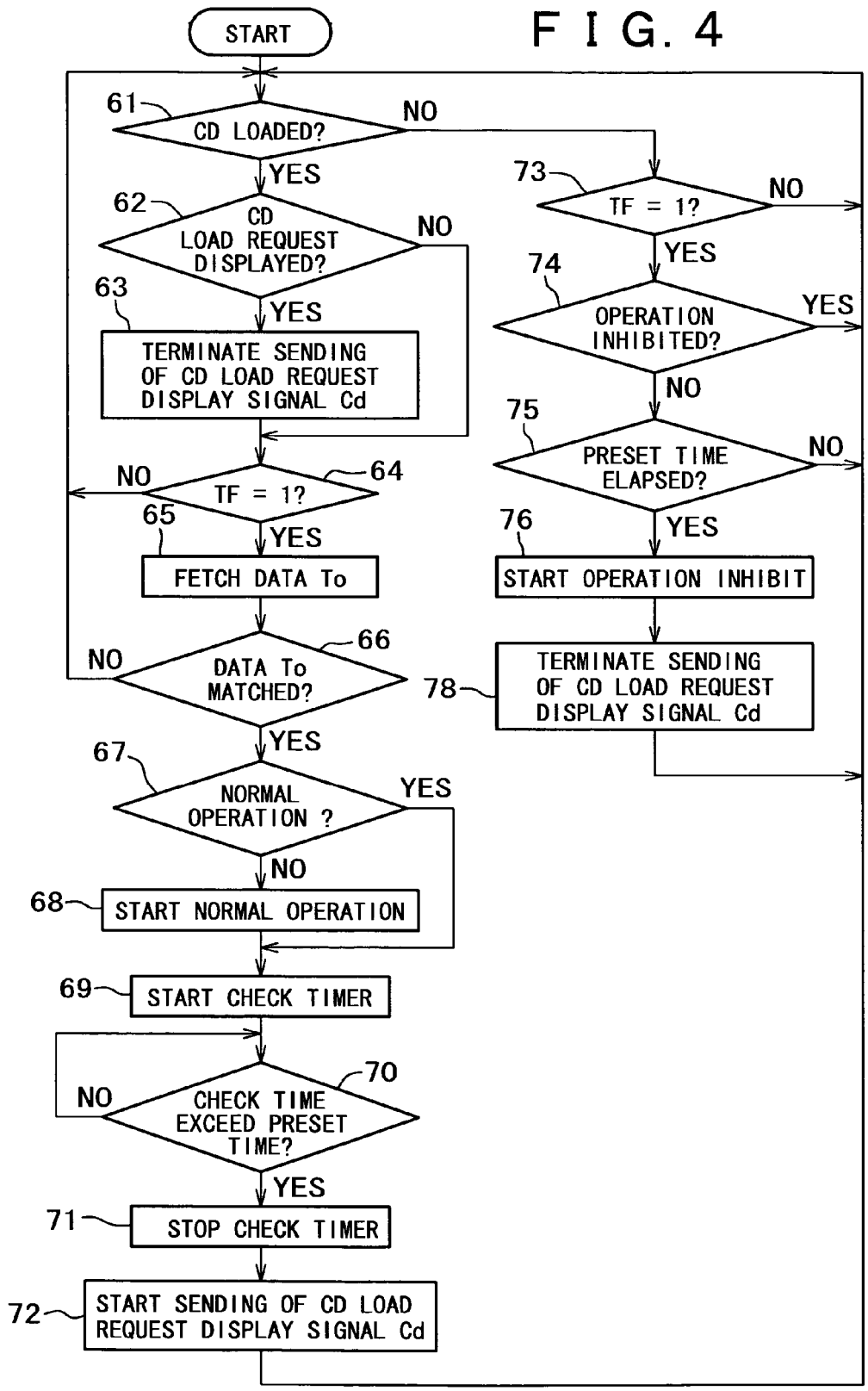
F I G. 4

INFORMATION REPRODUCING APPARATUS

CROSS REFERENCES TO RELATED APPLICATIONS

The present invention claims priority to its priority document No. 2003-354516 filed in the Japanese Patent Office on Oct. 15, 2003, the entire contents of which being incorporated by reference herein.

BACKGROUND OF THE INVENTION

1. Field of the Invention

The present invention set forth in claims of the present application relates to an information reproducing apparatus which carries out an operation to implement a theft preventive effect when reading out signals stored in a recording medium and reproducing information based on the signals read out.

2. Description of the Related Art

As to an information reproducing apparatus such as audio equipments or the like for reproducing audio information from signals recorded in a compact disc (hereinafter referred to as CD) which is one of information recording media, in particular, when it is portable of a compact and light-weighted type, or a on-vehicle use, there is a problem that it often becomes a target of theft. Therefore, it is proposed to disable the information reproducing apparatus to carry out its normal reproducing operation once it is stolen and/or removed by impairing its proper use so as to prevent theft. As such a theft prevention scheme of related art, there are proposed such information reproducing apparatus that has a removable part, or such one that requires a use of a pass word, or the like.

In the theft preventive scheme to be implemented by removing a part of the information reproducing apparatus, it is arranged, for example, such that a part or the whole of an operating section of the information reproducing apparatus is secured readily removable, thereby, when an authorized user does not use this information reproducing apparatus, the whole portion or a part of the operating section thereof is removed. Thereby, no one other than the authorized user who carries on the whole or the part of the operating section removed therefrom is allowed appropriately to use the information reproducing apparatus, as a result, a chance of a theft can be minimized.

Further, as for the theft preventive measure based on the use of a pass word, once an authorized user of the information reproducing apparatus completes registration of a pass word specified in advance via an input operating unit of the information reproducing apparatus, in the afterward, every time the authorized user wishes to use the apparatus, an input of the pass word via the input operating section is required. When the pass word is inputted via the input operation section, the inputted pass word is checked with a registered ID code, and consequently only when the inputted pass word is recognized to match with the registered ID code, the information reproducing apparatus is allowed to carry out a normal information reproducing operation. As a result, those who do not know the registered pass word, that is, any one other than the authorized user is not allowed to use the information reproducing apparatus, thereby preventing theft of the information reproducing apparatus.

However, in the case where the theft preventive measure is adopted by allowing a part of the information reproducing apparatus to be removed, for example, allowing to remove the whole or a part of the operation section thereof, there is such a problem that an authorized user may forget to remove the whole or the part of the operating section therefrom. In addition, it is difficult to find a replacement for such removed parts in the market, therefore, the removal of the whole or the part of the operating section from the information reproducing apparatus is considered not so effective for prevention of theft. Therefore, the case of the theft preventive measures based on the pass word may be considered more effective for prevention of theft than the case based on the removal of the part of the information reproducing apparatus in view of that the authorized user will be only person who would know the pass word. However, even in this case, what is likely to happen is that the authorized user may forget such a pass word, making it difficult even for the authorized user to appropriately use the information reproducing apparatus for reproducing information.

In contrast to the aforementioned theft preventive countermeasures, for an information reproducing apparatus such as an audio equipment for reproducing data recorded in a disc-like recording medium such as a CD, DVD (digital versatile disc), MD and the like, there is proposed a security system for preventing theft of the audio equipment by utilizing a data recorded in the disc-like recording medium, whereby the authorized user is no more required to memorize the pass word (for example, see Japanese Patent Publication No. 2566117).

The aforementioned security system already proposed can prevent a theft of audio equipment in which, for example, a mini disc is used, by utilizing a table-of-contents (hereinafter referred to as TOC) data which is recorded in the mini disc as a unique data thereof. In this type of the security system, a particular mini disc selected by the user of the audio equipment is specified as an ID disc for identification, and TOC data recorded in this ID disc is stored in a built-in memory in the audio equipment as an ID data. Next, if the audio equipment is disconnected from a battery of an original vehicle on which it is mounted, and connected to another battery of another vehicle, there occurs a fluctuation in its power voltage depending on a battery voltage, this fluctuation in the power voltage is sensed, and in response to this sensing, the audio equipment is set to an inoperable status.

This inoperable status of the audio equipment will be cancelled when the mini disc specified as an ID disc is loaded in the audio equipment, TOC data recorded therein is compared with an ID data stored in the built-in memory of the audio equipment, and the TOC data and the ID data are verified to match. By the way, in case the mini disc selected as the ID disc is such one in which a recorded TOC data is rewritable, it is arranged not to allow this TOC data to be stored in memory as an ID data, for avoiding its use as the ID disc.

SUMMARY OF THE INVENTION

In the aforementioned security system, it is difficult to identify the mini disc specified as the ID disc by any other except the authorized user of the audio equipment, thereby enabling to provide for a preventive effect against a theft of the audio equipment since if the audio equipment is removed from its original vehicle illegally and remounted on another vehicle, and if the audio equipment is set to an inoperable status, a cancellation of this inoperable status is made very difficult. However, this security system utilizes the inoperable status in the audio equipment when the audio equipment is disconnected from the battery of its proper vehicle, connected to another battery of another vehicle and upon sensing of a fluctuation in a power voltage due to a different voltage of the another battery. Accordingly, if this audio equipment has a built-in power supply without the need of connecting to a battery, or not for on-vehicle use, there is a drawback that this security system cannot be applied.

The present invention is made in view of the aforementioned situations associated with the apparatuses of related art. It is desirable to provide an information reproducing apparatus for reading signals recorded in a recording medium that is loaded in a recording medium loading section and obtaining information to be reproduced on the basis of the signals read out. The information reproducing apparatus is capable of inhibiting a normal information reproducing operation thereof when the information reproducing apparatus is stolen, and does not require a removable part nor inputting a pass word per use nor sensing of fluctuations in its power voltage, whose of which are required in related art, thereby providing an effective theft prevention measure.

An information reproducing apparatus according to an aspect of the present invention includes: a recording medium loading section to which an recording medium is loaded; an information reproducing section for reading a signal recorded in the recording medium loaded in the recording medium loading section for obtaining information to be reproduced on the basis of the signal read out; a registration section for registering a unique signal or a unique reproducing information obtained on the basis of the unique signal that is read out from a specific recording medium loaded in the recording medium loading section by storing the unique signal or the unique reproducing information in a memory section as an identification (ID) signal or as identification (ID) information; a judging section for judging whether or not another unique signal read out by the information reproducing section from a recording medium loaded in the recording medium loading section or another unique reproducing information based thereon matches with the ID signal or the ID information stored in the memory section, the judging being performed every time the another unique signal is read out or the another unique reproducing information is obtained; and an operation restriction section for stopping a normal reproducing operation by the information reproducing section for any information based on a signal other than the another unique signal recorded in the recording medium loaded in the recording medium loading section if a predetermined period of time is elapsed after the judging section judges that the another unique signal read out by the information reproducing section or the another unique reproducing information obtained on the basis of the another unique signal matches with the ID signal or the ID information stored in the memory section without further being judged by the judging section whether or not a newly read out unique signal or newly obtained unique reproducing information based thereon matches with the ID signal or the ID reproducing information stored in the memory section.

According to an information reproducing apparatus according to the aspect of the present invention, from a recording medium such as a CD, a unique signal indicative of its recording medium is selected from recorded signals therein. The selected recorded signal may be, for example, a TOC as a specific recording medium for specifying thereof, which may be such one that has, for example, a highest frequency of us. With the specific recording medium being loaded in the recording medium loading section, the unique signal read out from the specific recording medium by the information reproducing section and/or a unique reproducing information obtained on the basis of the unique signal therefrom are stored and registered in the memory section as the ID signal or the ID reproducing information by the registration section. Next, under a condition that the ID signal or the ID reproducing information are stored in the memory section, every time the information reproducing section reads out another unique signal specific to a recording medium being loaded into the recording medium loading section or obtains a unique reproducing information based on the unique signal, the judging section judges whether or not the another unique signal or the another unique reproducing information matches with the ID signal or the ID information already stored in the memory section.

Under such conditions described above, if the loading of the specific recording medium to the recording medium loading section is repeated at the same time interval or less than the predetermined period of time, every time the specific recording medium is loaded into the recording medium loading section, the judging section judges if the another unique signal read out by the information reproducing section or the another unique reproducing information obtained based thereon matched with the ID signal or the ID information already stored in the memory section. Accordingly, the information reproducing section of the information reproducing apparatus is allowed to continue a normal reproducing operation for reproducing information on the basis of the signals recorded in the recording medium loaded in the recording medium loading section.

In contrast to the above, if the loading of the specific recording medium to the recording medium loading section is not performed for a time period longer than the predetermined period of time, it is judged as that the predetermined period of time has elapsed after the judging section judges that the unique signal read out by the information reproducing section or the unique reproducing information based thereon have matched with the ID signal or the ID information already stored in the memory section without further being judged whether or not the another unique signal newly read out or the another unique reproducing information based thereon match with the ID signal or ID information already stored in the memory section, thereby causing the operation restriction section to stop the normal reproducing operation for any information based on a signal other than the another unique signal recorded in the recording medium loaded in the recording medium loading section. This status restricting the normal reproducing operation in the information reproducing section may be cancelled by the operation restriction section only after the specific recording medium is loaded into the recording medium loading section, and the judging section judges that the unique signal read out by the information reproducing section or the unique reproducing information obtained on the basis thereof matched with the ID signal or the ID reproducing information already stored in the memory section. However, until it is cancelled, the information reproducing apparatus is unable to reproduce information appropriately on the basis of any signal recorded in the recording medium loaded in the recording medium loading section.

Under these conditions described above, although the authorized user of the information reproducing apparatus can select the specific recording medium, the unauthorized user thereof cannot identify the specific recording medium because he/she would not have any knowledge of it. Accordingly, if the information reproducing apparatus once is set to the stop mode to stop the normal reproducing operation for any information based on a signal other than a unique signal recorded in a recording medium loaded in the recording medium loading section, the unauthorized user cannot cancel the stop mode thereof, and thus will not be able to operate the information reproducing apparatus to carry out the normal reproducing operation based on a signal recorded in a recording medium loaded in the recording medium loading section.

According to the information reproducing apparatus in accordance with an aspect of the present invention, if the information reproducing apparatus is stolen, it is ensured that the normal operation is prohibited and no reproduction of information is performed by the unauthorized user, without requiring to have any removal parts in the information reproducing apparatus, nor to input a pass word every time to use, nor to sense a fluctuation in a power supply voltage or the like as practiced in related art. As a result, the information reproducing apparatus would discourage the theft, thereby achieving the theft prevention effect.

BRIEF DESCRIPTION OF THE DRAWINGS

The above and other objects, features and advantages of the present invention will become more apparent from the following description of the presently exemplary embodiment of the invention taken in conjunction with the accompanying drawings, in which:

FIG. 4 is a flowchart showing an example of an operating program to be executed by the microcomputer which constitutes the operation controller in the exemplary embodiments shown in FIG. 1, when the same executes its control operation.

DETAILED DESCRIPTION OF THE EMBODIMENTS

Embodiments of the present invention will be described with reference to the accompanying drawings.

Figure 1:
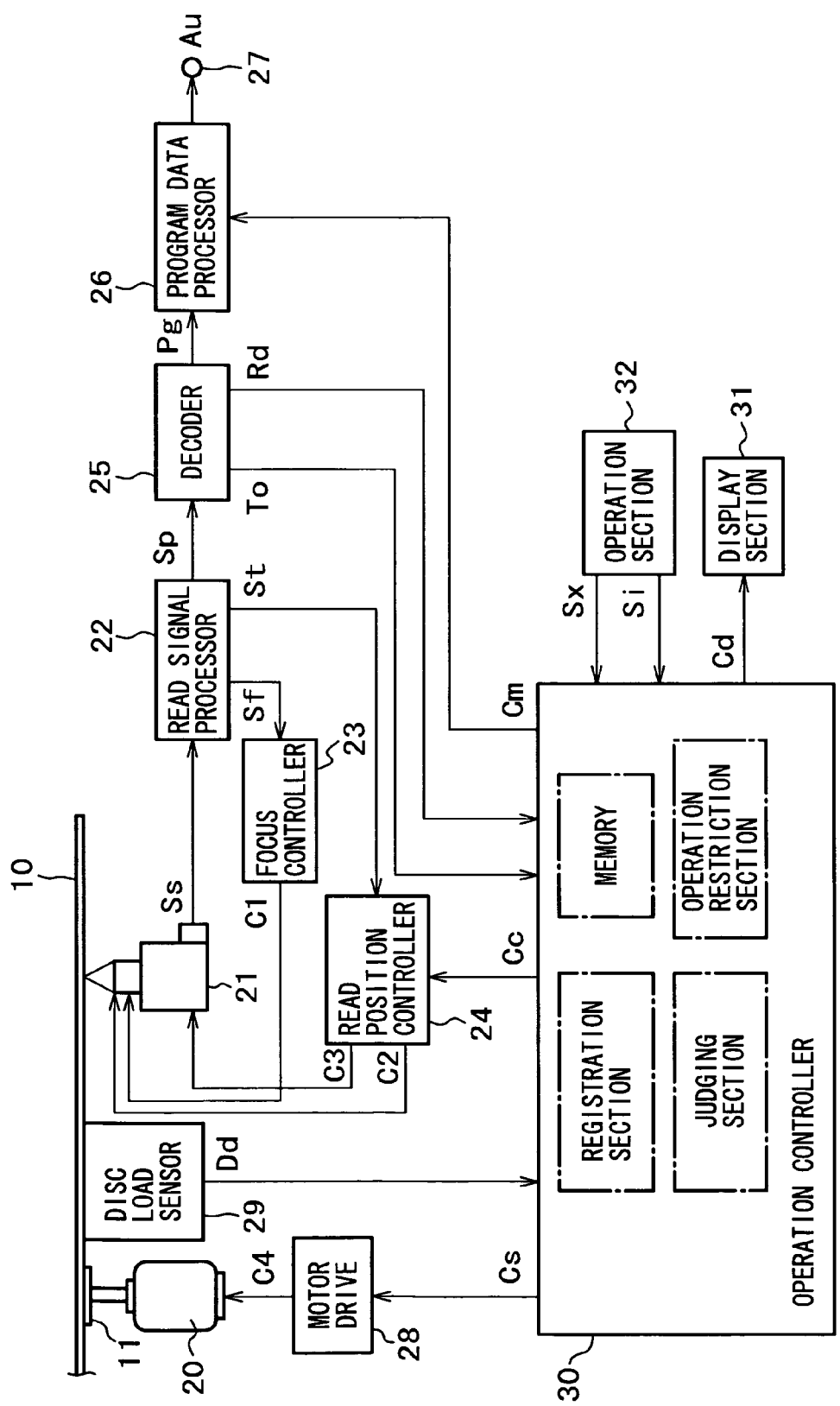
FIG. 1 is a schematic block diagram showing a main part of an exemplary information reproducing apparatus according to an embodiment of the present invention.

FIG. 1 shows a main part of an information reproducing apparatus according to an embodiment of the present invention.

Figure 2:
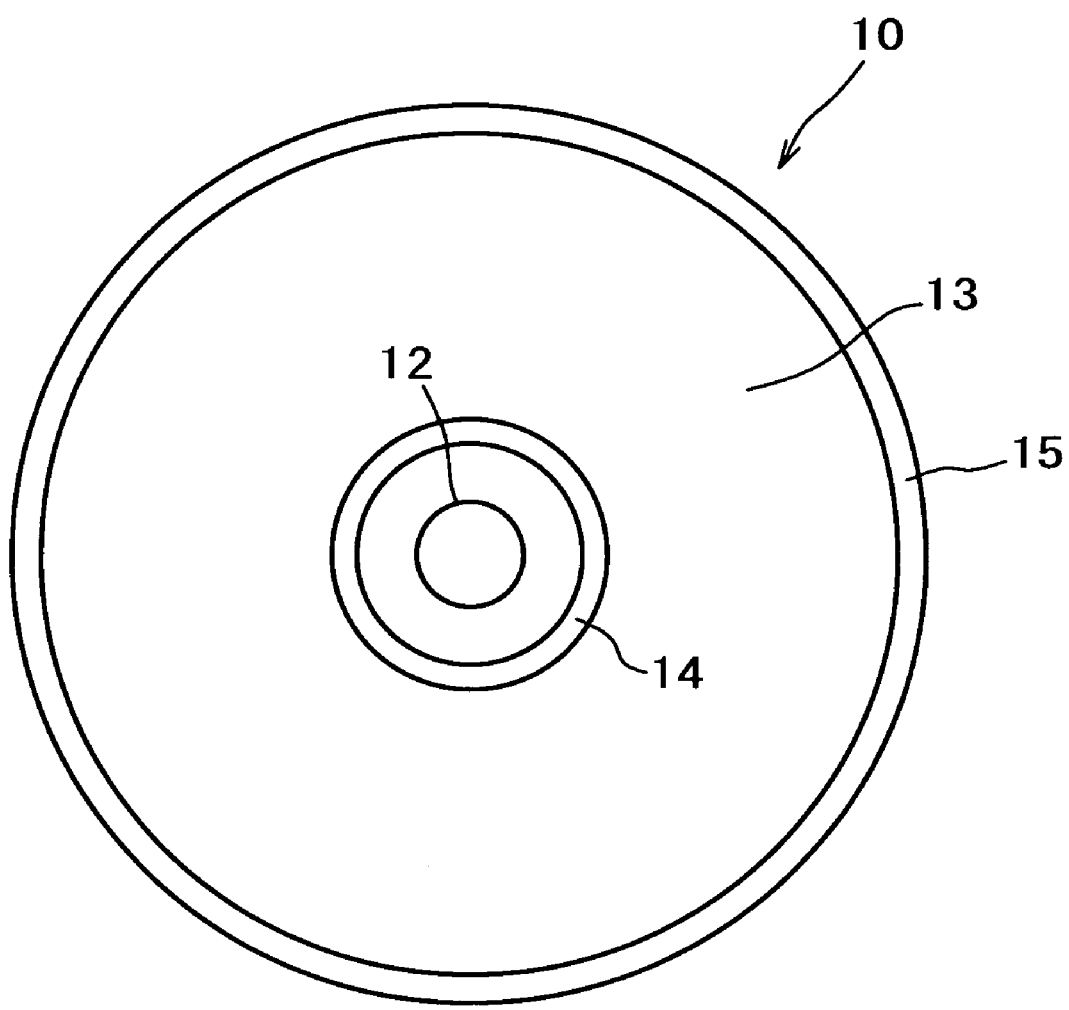
FIG. 2 is a plan view showing a CD to be loaded in a disc loader in the exemplary embodiment shown in FIG. 1.

An exemplary embodiment shown in FIG. 1 is an optical audio disc player for on-vehicle use that uses, for example, a CD as a recording medium. A CD 10 is loaded in a disc loading section 11 that constitutes a recording medium loading section. The CD 10 as shown in FIG. 2 has a center hole 12 and a recording area 13 extending radially therefrom. In the recording area 13, a lead-in area 14 of a rim-like shape is formed on its innermost periphery, and a lead-out area 15 of a rim-like shape is formed on its outermost periphery. A space between the lead-in area 14 and the lead-out area 15 within this recording area 13 is defined as a program area in which, for example, audio signal data which constitutes a program data including a plurality of chapters is recorded in association with its address data, thus forming a spiral recording track.

In the lead-in area 14, TOC data representing an index or the like covering the whole pieces of music recorded in the recording area 13 in the CD 10 is recorded forming its record track. Therefore, in the present embodiment, the TOC data is considered to make up a unique signal representing the CD 10 in which the same is recorded.

The CD 10 when loaded in a disc loading section 11 is driven by a disc drive motor 20 at a predetermined speed of revolution. Next, audio signal data, an address data and TOC data recorded in the CD 10 are read out by a signal read out section, i.e. an optical head 21. The optical head 21 irradiates the CD 10 with an optical beam such as a laser beam or the like, receives a reflected light beam therefrom which is modulated in accordance with a recorded track in the CD 10 using an optical sensor, and outputs a read-out signal Ss. Thereby, a point of arrival in the CD 10 of the optical beam from the optical head 21 becomes a point to be read in the CD 10 by the optical head 21. Further, the optical head 21 has a focus control mechanism for maintaining an optical beam incident on the CD 10 in an optimum convergence state and a tracking control mechanism for ensuring the optical beam incident on the CD 10 precisely to trace the recorded track, both of the mechanisms being of a built-in type, and further the whole of them are movable in radial directions of the CD 10, namely, in directions traversing the recorded track.

A read-out signal Ss obtained from the optical head 21 is supplied to a read signal processor section 22. From the read signal processor section 22 there are obtained: a read output signal Sp which includes TOC data, a program data and an address data; a focus error signal Sf; and a tracking error signal St. The focus error signal Sf is supplied to a focus control section 23, then, on the basis thereof, the focus control section 23 supplies a drive signal C1 to a focus control mechanism of the optical head 21 to carry out a focus control. Further, the tracking error signal St is supplied to a read position control section 24, on the basis thereof, the read position control section 24 supplies a drive signal C2 to a tracking control mechanism of the optical head 21 to carry out a tracking servo control.

Further, the read output signal Sp relating to the TOC data, program data and address data obtained from the read signal processor section 22 is supplied to a decoder 25. From this decoder 25, a reproducing program data Pg is obtained, and also reproducing TOC data To as well as a reproducing address data Rd are detected. Next, the reproducing program data Pg is supplied to a program data processor section 26 in which various types of processing are executed, and from which a reproducing audio signal Au that serves as a reproducing program information is obtained and sent to an output terminal 27. Further, the reproducing TOC data To and the reproducing address data Rd are supplied to the operation control section 30 respectively, and stored in a built-in memory section in the operation control section 30 if necessary. In the memory section, user information specifying an authorized user of the exemplary information reproducing apparatus shown in FIG. 1 is stored in advance as registered user information. Storage of the registered user information into the built-in memory section in the operation control section 30 is carried out by the authorized user, for example, when he/she starts to use the apparatus shown in FIG. 1.

In the configuration described above, the optical head 21, the read signal processor section 22, the decoder 25 and the program data processor section 26 in combination make up an information reproducing section which, by reading out audio signal data, an address data and TOC data recorded in the CD 10 loaded in the disc loading section 11, generates a reproducing audio signal Au, reproducing TOC data To and a reproducing address data Rd, which are pieces of reproducing information obtained on the basis of the audio signal data, the address data and the TOC data which are read out.

From the operation control section 30, a control signal Cc for controlling a reading position in the CD 10 to be read by the optical head 21 is supplied to the read position controller 24, a motor control signal Cs for controlling a speed of revolution of the disc drive motor 20 is supplied to the motor drive section 28, and a control signal Cm for controlling the generation and transmission of the reproducing audio signal Au is supplied to the program data processor section 26, respectively.

The reading position controller section 24, in response to the control signal Cs from the operation control section 30, outputs a drive signal C3 to the optical head 21 for shifting a reading position in the CD 10 to be read by the optical head 21 so that the optical head 21 carries out a fast forward or backward motion along the radius directions of the CD 10, and the same also outputs a drive signal C2 thereto so that a built-in tracking control mechanism in the optical head 21 carries out a track jump operation in the forward or backward directions. In this mode of control operation described above, the optical head 21 is set to carry out a search operation. In this search operation, the reproducing TOC data To and the reproducing address data Rd already stored in the memory section in the operation control section 20 are utilized. Further, the motor drive section 28, in response to the control signal Cs supplied from the operation control section 30, outputs a drive signal C4 to the disc drive motor 20 so as to drive the disc drive motor 20 at a speed of revolution corresponding, for example, to reading positions in the CD 10 by the optical head 21.

Still further, in the vicinity of the disc loader section 11, a disc load sensor section 29 is provided for sensing whether or not the CD 10 is loaded in the disc loader section 11. Upon detection of a loaded status of the disc loading section 11 loaded with the CD 10, the disc load sensor section 29 outputs a sensing output signal Dd to the operation control section 30 indicating that the CD 10 has been loaded into the disc loading section 11. In case the loaded status of the disc loading section 11 with the CD 10 is not detected, the same outputs a sensing output signal Dd to the operation control section 30 indicating that no CD 10 is loaded into the disc loading section 11.

In the operation control section 30 there are provided, in addition to the memory section, a registration section for registering reproducing TOC data To which is obtained from the decoder 25 corresponding to TOC data unique to a specific CD 10 which is loaded in the disc loader 11 and records the TOC data, by storing the same as an ID information in the memory section; a judging section for judging, every time reproducing TOC data To is obtained from the decoder 25 corresponding to TOC data unique to the specific CD 10 loaded in the disc loading section 11, whether or not the reproducing TOC data To matches with the ID information already stored in the memory section; and an operation restriction section for stopping a normal reproducing operation by the program data processor section 26 for a reproducing audio signal Au based on audio signal data which is a signal other than the TOC data recorded in the specific CD 10 loaded in the disc loader 11, if a predetermined period of time has elapsed after a preceding reproducing TOC data To obtained from the decoder 25 is verified by the judging section to match with the ID information stored in the memory section, without further being judged by the judging section whether or not reproducing TOC data newly obtained from the decoder 25 matches with the ID information stored in the memory section. Further, the operation control section 30 is connected to a display section 31 and an operating section 32.

This operation control section 30, in response to a command signal Sx from the operating section 32, outputs various control signals Cs, Cc, Cm and the like for performing operation controls of the motor drive 28, reading position controller 24, the program data processor section 26, and also outputs a display signal Cd to the display section 31 for displaying various image information.

In the operation control section 30, if the operating section 32 is operated by the authorized user, and a command signal Sx prompting a registration of TOC data and also an information signal Si indicating the user information are supplied from the operating section 32, it is judged whether or not the user information indicated by the information signal Si matches with the registered user information stored in the memory section in advance. Next, if the user information indicated by the information signal Si does not match with the registered user information already stored in the memory section, any operation in response to the command signal Sx prompting the registration of the TOC data will not be carried out.

On the other hand, if the user information indicated by the information signal Si matched with the registered user information already stored in the memory, in response to the command signal Sx prompting the registration of the TOC data, the CD 10 currently loaded or to be loaded subsequently into the disc loading section 11 will be identified as the specific CD 10 selected by the authorized user. In this situation, if a sensing output signal Dd from the disc load sensing section 29 indicates that no CD 10 is loaded in the disc loading section 11, the operation control section 30 prompts to the disc loading section 11 to load the CD 10, and outputs a display signal Cd indicative of its prompting. The display signal Cd from the operation control section 30 is supplied to the display section 31 in which image information indicating the prompt to the disc loading section 11 to load the CD 10 is displayed on the basis of the display signal Cd. Thus, a status in which the specific CD 10 is loaded in the disc loading section 11 by the authorized user is confirmed, and a sensing output signal Dd from the disc load sensing section 29 is considered to indicate that the CD 10 is loaded in the disc loader 11.

Subsequently, the registration section stores and registers a reproduced TOC data To obtained from the decoder 25 based on the TOC data which is a unique signal read out from the specific CD 10 loaded in the disc loading section 11 as the ID information in the memory section. In this instance, a CD 10 to be selected as the specific CD 10 by the authorized user may be, for example, such one for which a prompt for reproducing a particular audio signal data which constitutes the program data recorded therein is made most frequently by the authorized user, and thus is most frequently loaded in the disc loading section 11.

As described above, after the ID information is registered by the registration section and stored in the memory section, every time the CD 10 is loaded into the disc loading section 11, and the reproducing TOC data To is obtained from the decoder 25 on the basis of TOC data read out from the CD 10 loaded in the disc loading section 11. The judging section determines whether or not the reproducing TOC data To matches with the reproducing TOC data To already stored in the memory as the ID information. Next, after the judging section once determines that the reproducing TOC data To obtained from the decoder 25 matched with the reproducing TOC data To already stored in the memory as the ID information, if a first predetermined period of time elapses without a further operation by the judging section to judge whether or not reproducing TOC data To newly obtained from the decoder 25 matches with the ID information of the already stored reproducing TOC data To, the operation control section prompts to the disc loading section 11 to load the specific CD 10 described above, and a display signal Cd indicative of its prompt is supplied from the operation control section 30 to the display section 31. Thereby, in the display section 31, image information based on the display signal Cd indicating the prompt to load the specific CD 10 in the disc loading section 11 is displayed.

After the operation control section 30 outputted the display signal Cd and before a second predetermined period of time elapses, if the specific CD 10 is loaded into the disc loading section 11, its operation mode returns to the aforementioned status in which every time reproducing TOC data To is obtained from the decoder 25, the judging section judges whether or not the reproducing TOC data To from the decoder 25 matches with the reproducing TOC data To already stored in the memory as the ID information. In contrast, after the operation control section 30 outputted the display signal Cd, if the second predetermined period of time has elapsed without the specific CD 10 being loaded into the disc loading section 11, its operation mode is set to a status in which the operation restriction section stops a normal reproducing operation by the program data processor section 26 for a reproducing audio signal Au based on audio signal data which is a signal other than the TOC data recorded in the CD 10 loaded in the disc loading section 11, and a control signal Cm therefor is supplied from the operation control section 30 to the program data processor section 26.

Accordingly, the operation mode thereof is set to the status in which the program data processor section 26 stops the normal reproducing operation for the reproducing audio signal Au based on the audio signal data which is the signal other than the TOC data recorded in the CD 10 loaded in the disc loading section 11.

As described above, after the operation restriction section set the operation restriction mode in which the normal reproducing operation is stopped for the reproducing audio signal Au based on the audio signal data which is data other than the TOC data recorded in the CD 10 loaded in the disc loading section 11, if the specific CD 10 is loaded in the disc loading section 11, and if reproducing TOC data To obtained from the decoder 25 is verified by the judging section to match with the TOC data To already stored in the memory as the ID information, the operation restriction section cancels the operation restriction mode.

The aforementioned the first predetermined period of time and the second predetermined period of time in combination constitute the predetermined period of time preset in advance as described above. That is, each of the first predetermined period of time and the second predetermined period of time is shorter than the predetermined period of time preset in advance, and after the operation restriction section 30 outputted a control signal Cd, if the second predetermined period of time elapses without loading of the specific CD 10 into the disc loading section 11, it is considered that the predetermined period of time is elapsed after the preceding judging operation by the judging section in which the reproducing TOC data To obtained from the decoder 25 is verified to match with the ID information already stored in the memory without further being judged by the judging section whether or not reproducing TOC data To newly obtained from the decoder 25 matches with the ID information stored in the memory.

Next, in such an instance, because the operation restriction section disables the normal reproducing operation by the program data processor section 26 for a reproducing audio signal Au based on audio signal data which is a data other than the TOC data recorded in the CD 10 loaded in the disc loading section 11, the exemplary embodiment as shown in FIG. 1 is disabled to obtain any normal reproducing information based on a signal recorded in the CD 10 loaded in the disc loading section 11, thereby enabling to provide an effective theft prevention measure to the apparatus shown in FIG. 1.

In the exemplary embodiment described above with reference to FIG. 1, after the specific CD 10 is loaded in the disc loading section 11, the reproducing TOC data To obtained from the decoder 25 is registered as the ID information by storing in the memory section by the registration section in the operation control section 30. However, the present invention is not limited thereto, and it may be arranged also such that, instead of the reproducing TOC data To obtained from the decoder 25, TOC data contained in a read output signal Sp obtained from the read signal processor section 22 and read out from the specific CD 10 may be registered alternatively as the ID information by the registration section by storing in the memory section of the operation control section 30. In such an instance, under the condition that the specific CD 10 is loaded in the disc loading section 11, the registration section in the operation control section 30 registers TOC data which is read out from the specific CD 10 and is a data unique thereto, by storing the same as ID information in the memory section. Further, every time the CD 10 is loaded in the disc loading section 11 and its TOC data which is read out from the CD 10 and is a unique signal specific thereto is obtained, the judging section judges whether or not the TOC data thereof matches with the ID information which is the TOC data already stored in the memory section. Still further, after the judging section has judged once that the TOC data contained in a read output signal Sp obtained from the read signal processing section 22 matched with the ID information which is the TOC data already stored in the memory, if the predetermined period of time is elapsed without a further operation by the judging section to judge whether or not TOC data contained in a read output signal Sp newly obtained from the read signal processor section 22 matches with the TOC data already stored in the memory as the ID information, the operation restriction section is set to the stop mode to stop the normal reproducing operation by the program data processor section 26 for a reproducing audio signal Au based on audio signal data which is a signal other than the TOC data recorded in the CD 10 loaded in the disc loading section 11.

Further, according to the exemplary embodiment of the present invention shown in FIG. 1, it is arranged such that after the reproducing TOC data obtained from the decoder 25 is verified to match with the ID information stored in the memory section by the judging section, if the predetermined period of time has elapsed without a further operation by the judging section to judge whether or not reproducing TOC data To newly obtained from the decoder 25 matches with the ID information stored in the memory section, the operation restriction section is set to the stop mode to stop a normal reproducing operation by the program data processor section 26 for a reproducing audio signal Au based on audio signal data which is a signal other than the TOC data recorded in the CD 10 loaded in the disc loading section 11. However, instead of the above, it may be arranged also such that after the reproducing TOC data obtained from the decoder 25 is verified to match with the ID information stored in the memory section by the judging section, if the predetermined period of time has elapsed without a further operation by the judging section to judge whether or not reproducing TOC data To newly obtained from the decoder matches with the ID information stored in the memory section, or such that after the reproducing TOC data contained in a read output signal Sp obtained from the read signal processor section 22 is verified to match with the ID information stored in the memory section by the judging section, when the predetermined period of time elapses without a further operation by the judging section to judge whether or not TOC data contained in a read output signal Sp newly obtained from the read signal processor section 22 matches with the TOC data already stored in the memory section as the ID information, the operation restriction section may carry out the following operations such as that: a reading operation by the optical head 21 for audio signal data which is a signal other than the TOC data recorded in the CD 10 loaded in the disc loading section 11 may be stopped; or audio signal data may be excluded from the read output signal Sp to be obtained from the read signal processor section 22; or the reproducing program data Pg may be prevented being obtained from the decoder 25.

Figure 3:
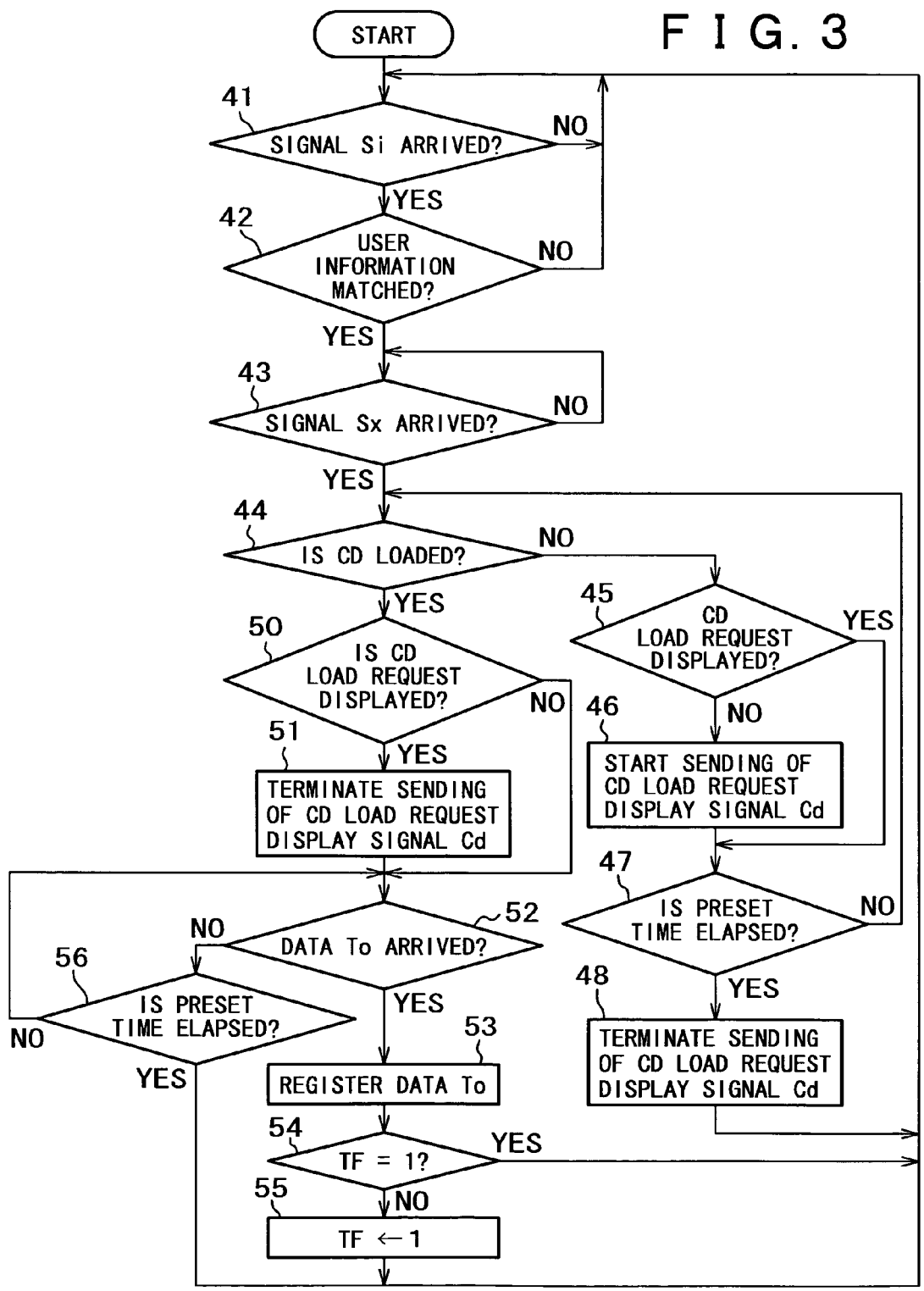
FIG. 3 is a flowchart showing an example of an operating program to be executed by a microcomputer which constitutes an operation controller in the exemplary embodiment shown in FIG. 1, when the same executes its control operation.

The operation control section 30 which carries out the aforementioned control operations may be realized, for example, by a microcomputer. FIG. 3 shows a flowchart indicating an example of operation programs to be executed by a microcomputer which constitutes the operation control section 30 when registering reproducing TOC data To and storing in the memory section as the ID information.

In the flowchart shown in FIG. 3, after the start, it is judged in step 41 whether or not an information signal Si arrives. If the information signal Si does not arrive, the judgment of step 41 is repeated, and if the information signal Si arrives, it is further judged in step 42 whether or not user information indicated by the information signal Si matches with the user information stored in the memory section in advance. In case the user information indicated by the information signal Si does not match with the registered user information stored in the memory section in advance, the flow returns to step 41.

On the contrary, if the user information indicated by the information signal Si matches with the registered user information already stored in the memory, it is judged in step 43 whether or not a command signal Sx arrives. If the command signal Sx does not arrive, the judgment of step 43 is repeated, and if the command signal Sx arrives, it is further judged in step 44 whether or not the CD 10 is loaded in the disc loading section 11 based on a sensing output signal Dd from the disc load sensing section 29.

As a result of judgment in step 44, if no CD 10 is loaded in the disc loading section 11, it is further judged in step 45 whether or not an image display indicating a prompt for loading the CD 10 in the disc loading section 11 is displayed on the display section 31. If the prompt for loading the CD 10 in the disc loading section 11 is not displayed on the display section 31, a prompt to the disc loading section 11 for loading the CD 10 is made in step 46, and sending of a display signal Cd indicative of the prompt is initiated, and the flow proceeds to step 47. As a result of judgment in step 45, if it is judged that the image display indicating the prompt for loading the CD 10 in the disc loading section 11 is displayed on the display section 31, the flow jumps from step 45 to step 47.

In step 47, it is judged whether or not a predetermined period of time has elapsed after the start of sending the display signal Cd in step 46. In case the predetermined period of time is not elapsed after the start of sending the display signal Cd in step 46, the flow returns to step 44 to determine whether or not the CD 10 is loaded in the disc loading section 11. If it is determined that the predetermined period of time is elapsed after the start of sending of the display signal Cd in step 46, the sending of the display signal Cd indicating the prompt for loading the CD 10 into the disc loading section 11 is terminated in step 48, and the flow returns to step 41.

On the other hand, as a result of judgment in step 44, if the CD 10 is found to be loaded in the disc loading section 11, this CD 10 loaded in the disc loading section 11 is recognized as the specific CD 10 selected by the authorized user, and it is judged in step 50 whether or not an image display indicating the prompt for loading the CD 10 into the disc loading section 11 is displayed on the display section 31. If the prompt for loading the CD 10 into the disc loading section 11 is displayed on the display section 31, the sending of the display signal Cd indicating the prompt for loading the CD 10 into the disc loading section 11 is terminated in step 51, thereby terminating the image display of the prompt for loading a CD into the disc loading section 11 by the display section 31. Next, the flow advances to step 52. On the contrary, if it is judged in step 50 that the image display indicating the prompt for loading the CD 10 into the disc loading section 11 is not displayed by the display section 31, the flow jumps from step 50 to step 52.

In step 52, it is judged whether or not reproducing TOC data To arrives. If it is judged that reproducing TOC data To arrives, this reproducing TOC data To is registered as the ID information and stored in the memory section in step 53. Subsequently, in step 54, it is judged whether or not a registration flag TF is "1", and if the registration flag TF is "1", the flow returns to step 41, and if the registration flag TF is not "1", the registration flag TF is set "1". Next, the flow returns to step 41.

Further, as the result of judgment in step 52, if reproducing TOC data To does not arrive, it is judged in step 56 whether or not the predetermined period of time is elapsed after the CD 10 is judged to be loaded in the disc loading section 11 in step 44. If the predetermined period of time does not elapse, the flow returns to step 52 to repeat the judgment whether or not the reproducing TOC data To arrives. If the predetermined period of time is elapsed, the flow returns to step 41.

FIG. 4 is a flowchart showing an example of an operating program to be executed by a microcomputer which constitutes the operation control section 30 for enabling a stop control to stop a normal reproducing operation by the program data processor section 26 for a reproducing audio signal Au based on audio signal data which is a signal other than TOC data recorded in the CD 10 loaded in the disc loading section 11.

According to the flowchart shown in FIG. 4, after the start, it is judged on the basis of a sensing output signal Dd from the disc load sensing section 29 whether or not the CD 10 is loaded in the disc loading section 11 in step 61. If the CD 10 is loaded in the disc loading section 11, it is judged in step 62 whether or not an image display indicating a prompt for loading the CD 10 into the disc loading section 11 is displayed on the display section 31. In the case where the image display indicating the prompt for loading the CD 10 into the disc loading section 11 is displayed on the display section 31, the sending of the display signal Cd indicating the prompt for loading the CD 10 into the disc loading section 11 is terminated in step 63, thereby terminating the image display on the display section 31 prompting to load the CD 10 into the disc loading section 11, then the flow proceeds to step 64. As the result of judgment in step 62, if the image display by the display section 31 indicating the prompt for loading the CD 10 into the disc loading section 11 is not displayed, the flow jumps from step 62 to step 64.

In step 64, it is judged whether or not the registration flag TF is "1", and if the registration flag TF is not "1", the flow returns to step 61. If it is "1", the flow proceeds to step 65. In step 65, reproducing TOC data To obtained in the decoder 25 is fetched therefrom, then in subsequent step 66, it is judged whether or not the reproducing TOC data To fetched in step 65 matches with an ID information which is the reproducing TOC data To stored in the memory section. If the reproducing TOC data To fetched in step 65 matched with the reproducing TOC data To as the ID information stored in the memory section, it is judged in step 67 whether or not the program data processor section 26 is in the normal operating condition free from operation restriction.

As a result of judgment in step 67, in case the program data processor section 26 is not in the normal operating condition subjected to operation restriction, the program data processor section 26 is enabled to set to a status capable of starting its normal operation in step 68, then the flow advances to step 69. On the contrary, as the result of judgment in step 67, the program data processor section 26 is in the normal operating condition free from the operation restriction, the flow jumps from step 67 to step 69.

In step 69, a check timer is started, and in subsequent step 70, it is judged whether or not a check time counted by the check timer exceeds a predetermined period of time. As a result, if the check time does not exceed the predetermined period of time, the judgment in step 70 is repeated. If the check time exceeded the predetermined period of time, the check timer is stopped in step 71, then in step 72, a prompt for loading the CD 10 in the disc loading section 11 is issued, and the sending of a display signal Cd indicating the prompt is started, after then the flow returns to step 61.

Further, as the result of judgment in step 66, if the reproducing TOC data To fetched in step 65 does not match with the ID information which is the reproducing TOC data To stored in the memory section, the flow returns to step 61.

On the other hand, as the result of judgment in step 61, if the CD 10 is not loaded in the disc loading section 11, it is judged in step 73 whether or not its registration flag TF is "1". If the registration flag TF is not "1", the flow returns to step 61. If the registration flag TF is "1", the flow proceeds to step 74. It is judged in step 74 whether or not the program data processor section 26 is not in the normal operating condition subjected to the operation restriction.

As a result of judgment in step 74, if the program data processor section 26 is not in the normal operating condition subjected to the operation restriction, the flow returns to step 61. If the program data processor section 26 is in the normal operating condition free from the operation restriction, the flow proceeds to step 75. It is judged in step 75 whether or not a predetermined period of time is elapsed since the first judgment is made in step 61 whether or not the CD 10 is loaded in the disc loading section 11. If the predetermined period of time is not elapsed since the first judgment in step 61 whether or not the CD 10 is loaded in the disc loading section 11, the flow returns to step 61, otherwise if the predetermined period of time is elapsed since the first judgment in step 61 whether or not the CD 10 is loaded in the disc loading section 11, the flow proceeds to step 76.

In step 76, an operation restriction mode is started to restrict the operation of the program data processor section 26. Subsequently, in step 78, the sending of display signal Cd indicating the prompt for loading the CD 10 in the disc loading section 11 is terminated, and thus the image display by the display section 31 indicating the prompt for loading the CD 10 to the disc loading section 11 is terminated, then the flow returns to step 61.

The information reproducing apparatus according to the embodiments of the present invention is an apparatus for reproducing information recorded in a recording medium such as a CD, in which a unique signal specific to its recording medium, which is, for example, a so-called TOC, is recorded, and used for enabling an effective theft prevention mode which can be implemented conveniently without placing a burden on the user. Accordingly, the present invention may be applied widely.

Obviously, numerous modifications and variations of the present invention are possible in light of the above teachings. It is therefore to be understood that within the scope of the appended claims, the invention may be practiced otherwise than as specifically described therein.

What is claimed is:

1. An information reproducing apparatus comprising:
a memory section for storing information;
a recording medium loading section for loading a recording medium;
an authorized user information specifying section for specifying user registration information of an authorized user of the information reproducing apparatus and storing the user registration information in the memory section;
an information reproducing section for reading a signal recorded in the recording medium for obtaining information to be reproduced based on the signal read out;
an operating section for supplying user operating information;
a registration section for registering, upon determining that the user operating information matches the user registration information, a unique signal or unique reproducing information, based on a first signal that is read out from a specific recording medium loaded in the recording medium loading section, by storing the unique signal or the unique reproducing information in the memory section;
a judging section for judging whether a second signal read out by the information reproducing section corresponds to the unique signal or the unique reproducing information stored in the memory section, the judging being performed every time a signal is obtained from the information reproducing section; and
an operation restriction section for restricting operation by the information reproducing section for any information based on a signal which does not correspond to the unique signal recorded in the recording medium, and executing the restricting operation:
when, upon judging that the second signal read out by the information reproducing section corresponds to the unique signal or the unique reproducing information stored in the memory section, and after a first predetermined period of time elapses without additional judging, a user does not provide, responsive to a prompt, the specific recording medium having a signal corresponding to the unique signal or the unique reproducing information; and
when a signal obtained from the information reproducing section does not correspond to the unique signal or the unique reproducing information stored in the memory section within a second predetermined period of time;
wherein the second predetermined period of time is a shorter time than the first predetermined period of time.

2. The information reproducing apparatus according to claim 1, wherein the unique signal is table of content data recorded in the recording medium.

3. The information reproducing apparatus according to claim 1, wherein the registration section stores and registers a plurality of different unique signals or unique reproducing information in the memory section.

4. The information reproducing apparatus according to claim 1, wherein the operation restriction section cancels a non-operable status if the judging section judges that a signal obtained from the information reproducing section corresponds to the unique signal or the unique reproducing information stored in the memory section after the non-operable status is set, the non-operable status being a status in which the normal reproducing operation is stopped.

5. The information reproducing apparatus according to claim 1, wherein the prompt for loading the specific recording medium into the recording medium loading section is made in the form of an image display by a display section.

6. An information reproducing method comprising the steps of:
   specifying user registration information of an authorized user and storing the user registration information in a memory;
   loading a recording medium;
   reading a signal recorded in the recording medium for obtaining information to be reproduced based on the signal read out;
   receiving user operating information;
   registering, upon determining that the received user operating information matches the user registration information, a unique signal or unique reproducing information, based on a first signal that is read out from a specific recording medium by storing the unique signal or the unique reproducing information in the memory;
   judging whether a second signal read out corresponds to the unique signal or the unique reproducing information stored in the memory, the judging being performed every time a signal is obtained from a recording medium; and
   restricting operation for any information based on a signal which does not correspond to the unique signal recorded in the recording medium, wherein operation is restricted:
   when, upon judging that the second signal read out corresponds to the unique signal or the unique reproducing information stored in the memory, and after a first predetermined period of time elapses without additional judging, a user does not provide, responsive to a prompt, the specific recording medium having a signal corresponding to the unique signal or the unique reproducing information; and
   when a signal read out does not correspond to the unique signal or the unique reproducing information stored in the memory within a second predetermined period of time;
   wherein the second predetermined period of time is a shorter time than the first predetermined period of time.

7. The method of claim 6, wherein the unique signal is table of content data recorded in the recording medium.

8. The method of claim 6, wherein a plurality of different unique signals or unique reproducing information are stored and registered in the memory section.

9. The method of claim 6, wherein a non-operable status is canceled if judging indicates that a signal obtained from the recording medium corresponds to the unique signal or the unique reproducing information stored in the memory after the non-operable status is set, the non-operable status being a status in which the normal reproducing operation is stopped.

10. The method of claim 6, wherein the prompt for loading the specific recording medium is made in the form of an image display.

* * * * *